US010274886B2

(12) United States Patent
Ko et al.

(10) Patent No.: US 10,274,886 B2
(45) Date of Patent: Apr. 30, 2019

(54) POST-PROCESSING APPARATUS INCLUDING A TRANSPORT MEMBER INCLUDING A REINFORCING PORTION

(71) Applicant: FUJI XEROX CO., LTD., Tokyo (JP)

(72) Inventors: Dukhyun Ko, Incheon (KR); Woong Lee, Incheon (KR)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/699,053

(22) Filed: Sep. 8, 2017

(65) Prior Publication Data

US 2018/0239292 A1     Aug. 23, 2018

(30) Foreign Application Priority Data

Feb. 23, 2017   (JP) .................. 2017-032140

(51) Int. Cl.
| | | |
|---|---|---|
| B65H 31/36 | (2006.01) | |
| G03G 15/00 | (2006.01) | |
| B42C 1/12 | (2006.01) | |
| B65H 39/105 | (2006.01) | |
| B65H 31/30 | (2006.01) | |
| B65H 31/02 | (2006.01) | |

(Continued)

(52) U.S. Cl.
CPC .......... G03G 15/6529 (2013.01); B42C 1/12 (2013.01); B65H 31/02 (2013.01); B65H 31/10 (2013.01); B65H 31/14 (2013.01); B65H 31/18 (2013.01); B65H 31/3081 (2013.01); B65H 31/36 (2013.01); B65H 39/105 (2013.01); B65H 31/3063 (2013.01); B65H 2301/4212 (2013.01); B65H 2301/4213 (2013.01); B65H 2403/945 (2013.01); B65H 2404/1114 (2013.01); B65H 2405/11151 (2013.01); B65H 2601/324 (2013.01); B65H 2801/06 (2013.01); B65H 2801/27 (2013.01); G03G 2215/0487 (2013.01); G06F 3/1264 (2013.01)

(58) Field of Classification Search
CPC .............. G03G 15/6529; B65H 39/105; B65H 31/3081; B65H 31/36; B65H 31/02; B65H 31/10; B65H 31/14; B65H 31/18; B42C 1/12
See application file for complete search history.

(56) References Cited

U.S. PATENT DOCUMENTS

| | | | | |
|---|---|---|---|---|
| 4,900,006 A | * | 2/1990 | Mandel ................ | B65H 3/0638 271/120 |
| 6,116,594 A | * | 9/2000 | Boost .................... | B65H 31/36 271/236 |

(Continued)

FOREIGN PATENT DOCUMENTS

JP     2004-277158 A     10/2004

*Primary Examiner* — Patrick H Mackey
(74) *Attorney, Agent, or Firm* — Sughrue Mion, PLLC

(57) ABSTRACT

A post-processing apparatus includes a storing unit in which plural recording media are stored for performing post-processing and a transport member that transports a recording medium to the storing unit as a result of rotating while being in contact with a surface of the recording medium. The transport member includes a blade that comes into contact with a recording medium and a reinforcing portion that reinforces a strength of a portion of the blade that does not come into contact with the recording medium.

12 Claims, 17 Drawing Sheets

(51) Int. Cl.
*B65H 31/10* (2006.01)
*B65H 31/14* (2006.01)
*B65H 31/18* (2006.01)
G06F 3/12 (2006.01)

(56) References Cited

U.S. PATENT DOCUMENTS

| | | | | |
|---|---|---|---|---|
| 7,419,150 | B2* | 9/2008 | Kushida | B42C 1/12 |
| | | | | 270/58.07 |
| 7,673,867 | B2* | 3/2010 | Keny | B42C 1/12 |
| | | | | 270/58.07 |
| 2014/0226994 | A1* | 8/2014 | Leemhuis | G03G 15/086 |
| | | | | 399/13 |
| 2017/0166413 | A1* | 6/2017 | Taki | B65H 39/10 |

\* cited by examiner

POST-PROCESSING APPARATUS INCLUDING A TRANSPORT MEMBER INCLUDING A REINFORCING PORTION

CROSS-REFERENCE TO RELATED APPLICATIONS

This application is based on and claims priority under 35 USC 119 from Japanese Patent Application No. 2017-032140 filed Feb. 23, 2017.

BACKGROUND (i) Technical Field

The present invention relates to a post-processing apparatus.

(ii) Related Art

In a post-processing apparatus that performs post-processing, such as stapling or punching, on a recording medium, such as a printing sheet, on which a printing operation has been performed, plural printing sheets on each of which the post-processing is to be performed are stored in a storing unit called a compilation tray, and then the post-processing is performed on the stored printing sheets.

A member that has a paddle-like shape and includes blades is used as a transport member that transports a printing sheet to such a compilation tray.

Here, in the case of not performing post-processing on printing sheets and in the case of ejecting a stack of printing sheets that are produced by performing stapling on plural printing sheets stored in the compilation tray, the printing sheets are ejected to an ejection tray or the like by passing through the location at which the transport member is disposed.

Accordingly, there is a case where switching control for causing the transport member to move downward when a printing sheet is to be transported to a storing unit, such as the compilation tray, and to move upward when a printing sheet or a stack of printing sheets is caused to pass through the location at which the transport member is disposed is performed.

There is also a configuration in which such switching control for causing the transport member to move upward and downward does not need to be performed and in which the center of rotation of the transport member does not move upward and downward. However, in the case where such a configuration is employed, the distance from the center of rotation of the transport member to a printing sheet becomes large, and it is necessary to increase the lengths of the blades of the transport member.

In the case where each of the blades of the transport member is formed of a member whose end portion and bottom portion have the same strength and where the length of each of the blades is increased, it is difficult to secure a necessary transport force, and there is a possibility of insufficient transport force.

Accordingly, forming each of the entire blades out of a member having a large strength may be considered. However, if such a configuration is employed, contrary to the above, the transport force becomes excessively large, and the probability of occurrence of a paper jam increases.

SUMMARY

According to an aspect of the invention, there is provided a post-processing apparatus including a storing unit in which plural recording media are stored for performing post-processing and a transport member that transports a recording medium to the storing unit as a result of rotating while being in contact with a surface of the recording medium. The transport member includes a blade that comes into contact with a recording medium and a reinforcing portion that reinforces a strength of a portion of the blade that does not come into contact with the recording medium.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described in detail below with reference to the drawings.

Figure 1:
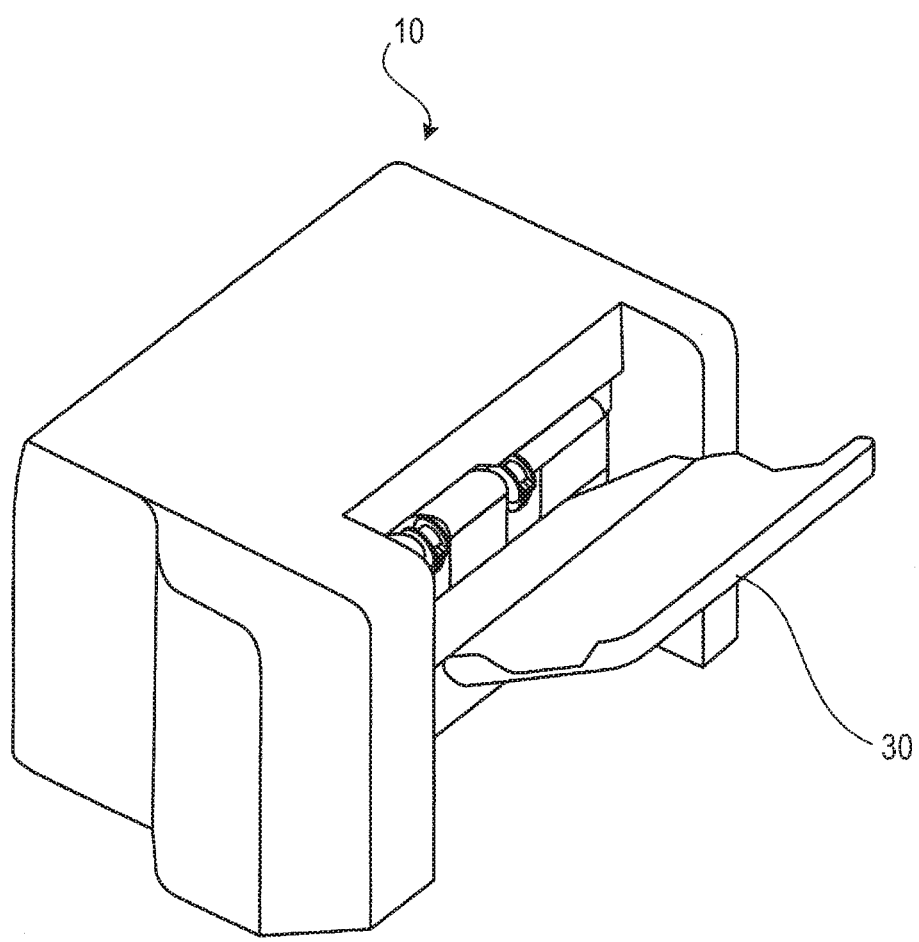
FIG. 1 a perspective view illustrating the appearance of a post-processing apparatus according to an exemplary embodiment of the present invention.

FIG. 1 is a perspective view illustrating the appearance of a post-processing apparatus 10 according to an exemplary embodiment of the present invention.

As illustrated in FIG. 1, the post-processing apparatus 10 according to the exemplary embodiment of the present invention has a shape such that the post-processing apparatus 10 is used by being connected to a printer. The post-processing apparatus 10 has a function of performing post-processing, such as stapling, on plural printing sheets ejected from the printer and then ejecting a stack of the printing sheets, on which the post-processing has been performed, to an ejection tray 30.

Figure 2:
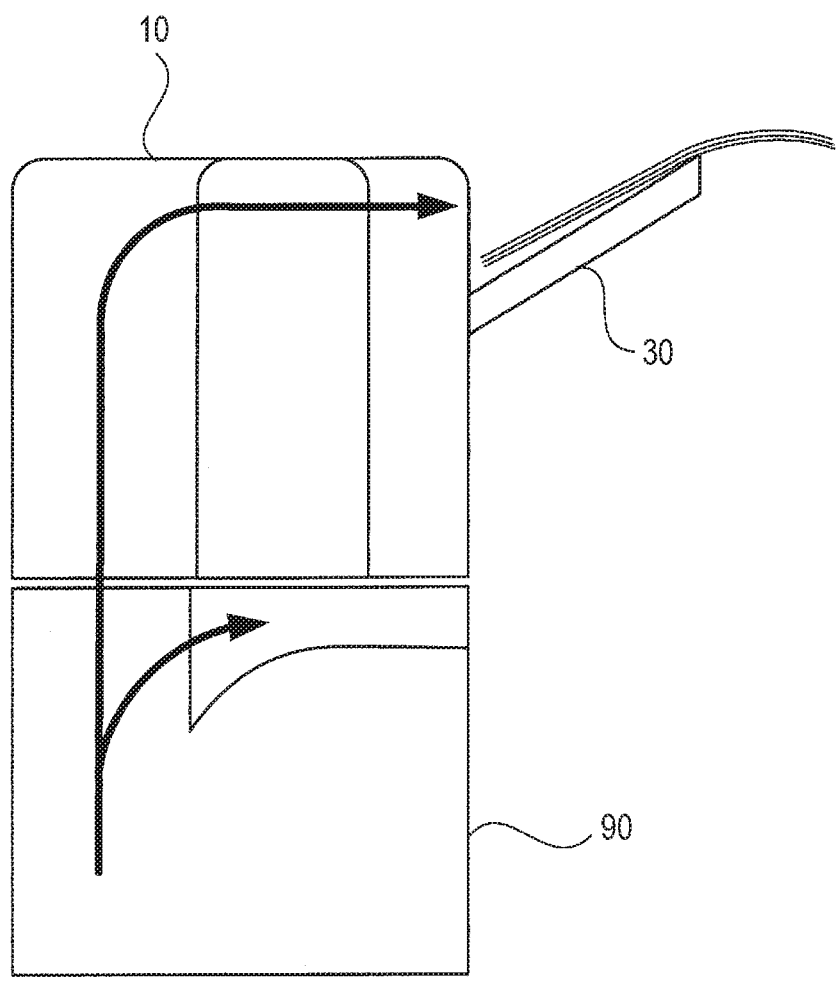
FIG. 2 is a diagram illustrating a state in which the post-processing apparatus according to the exemplary embodiment of the present invention is used by being connected to a printer.

A state in which the post-processing apparatus 10 is used by being connected to a printer 90 is illustrated in FIG. 2.

FIG. 2 illustrates a state in which the post-processing apparatus 10 ejects, to the ejection tray 30, a stack of printing sheets obtained by performing the post-processing, such as stapling, on printing sheets that are ejected from the printer 90 and introduced into the post-processing apparatus 10.

The configuration of the post-processing apparatus 10 according to the present exemplary embodiment for performing the post-processing on printing sheets and performing an ejecting operation that is to be performed after the post-processing has been performed will now be described.

Figure 3:
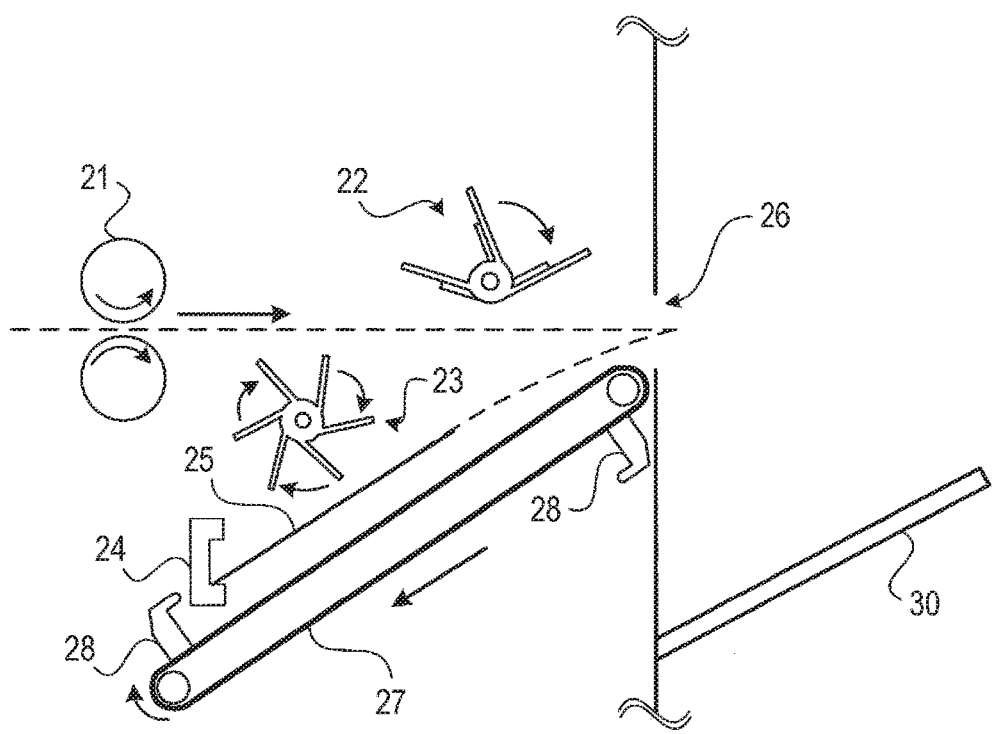
FIG. 3 is a schematic sectional view illustrating the configuration of a principal mechanism for performing post-processing in the post-processing apparatus according to the exemplary embodiment of the present invention.

FIG. 3 is a schematic sectional view illustrating the configuration of a principal mechanism for performing the post-processing in the post-processing apparatus 10 according to the present exemplary embodiment. Note that FIG. 3 is a schematic sectional view illustrating an operation for ejecting a stack of printing sheets performed by the post-processing apparatus 10 and does not accurately illustrate the positional relationship in the actual configuration.

Referring to FIG. 3, the post-processing apparatus 10 according to the present exemplary embodiment includes transport rollers 21, sub-paddles 22, main paddles 23, an end guide 24, a compilation tray 25, an ejection port 26, ejection belts 27, four stoppers 28, and the ejection tray 30.

The transport rollers 21 transport a printing sheet that is ejected from a printer or the like and on which the post-processing is to be performed.

The compilation tray 25 is a storing unit in which plural printing sheets are stored for performing the post-processing. A post-processing mechanism (not illustrated) performs the post-processing such as, for example, stapling or punching on a stack of the printing sheets stored in the compilation tray 25.

The main paddles 23 and the sub-paddles 22 are each formed in such a manner as to have the shape of a paddle (blade) having flexibility and are transport members that transport a printing sheet in a given direction as a result of rotating.

The sub-paddles 22 transport a printing sheet transported from the upstream side of a transport path by the transport rollers 21 in a direction toward the compilation tray 25. More specifically, each of the sub-paddles 22 is a transport member that transports a recording medium, such as a printing sheet, to the compilation tray 25 as a result of rotating while being in contact with a surface of the recording medium.

Each of the sub-paddles 22 according to the present exemplary embodiment includes blades each of which comes into contact with a printing sheet and a reinforcing portion that reinforces the strengths of portions of the blades that do not come into contact with the printing sheet. A detailed configuration of each of the sub-paddles 22 will be described later.

The main paddles 23 keep transporting a printing sheet transported by the sub-paddles 22 further toward the compilation tray 25 until an end of the printing sheet reaches the end guide 24.

The end guide 24 is a sheet-aligning unit used for aligning a trailing end of a stack of the printing sheets accommodated in the compilation tray 25.

A tamper (not illustrated) operates in accordance with the timing at which printing sheets reach the end guide 24, and as a result, alignment of a stack of the printing sheets on the compilation tray 25 in a width direction is performed.

The ejection belts 27 are driven when ejecting a stack of printing sheets on which the post-processing has been performed, and a pair of the stoppers 28 are mounted on each of the ejection belts 27. As a result of each of the ejection belts 27 being driven, the corresponding two stoppers 28 perform an operation for ejecting the stack of printing sheets, on which the post-processing has been performed in the compilation tray 25, from the ejection port 26 by moving in such a manner as to push the trailing end of the stack of printing sheets.

Figure 4:
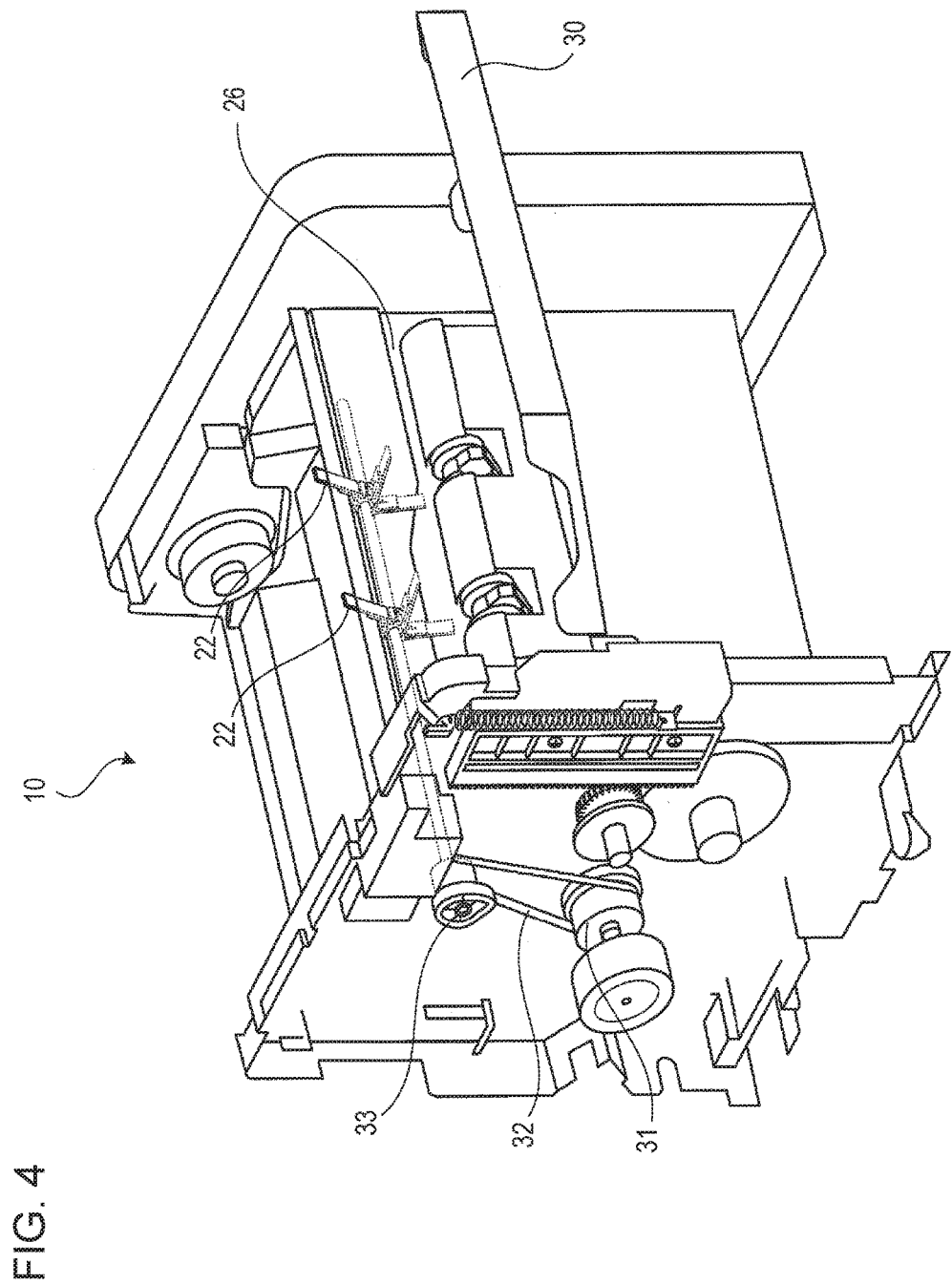
FIG. 4 is a perspective view illustrating the internal structure of the post-processing apparatus according to the exemplary embodiment of the present invention from which a side-surface cover and a top-surface cover have been removed.

FIG. 4 is a perspective view illustrating the internal structure of the post-processing apparatus 10 according to the present exemplary embodiment from which a side-surface cover and a top-surface cover have been removed.

Figure 5:
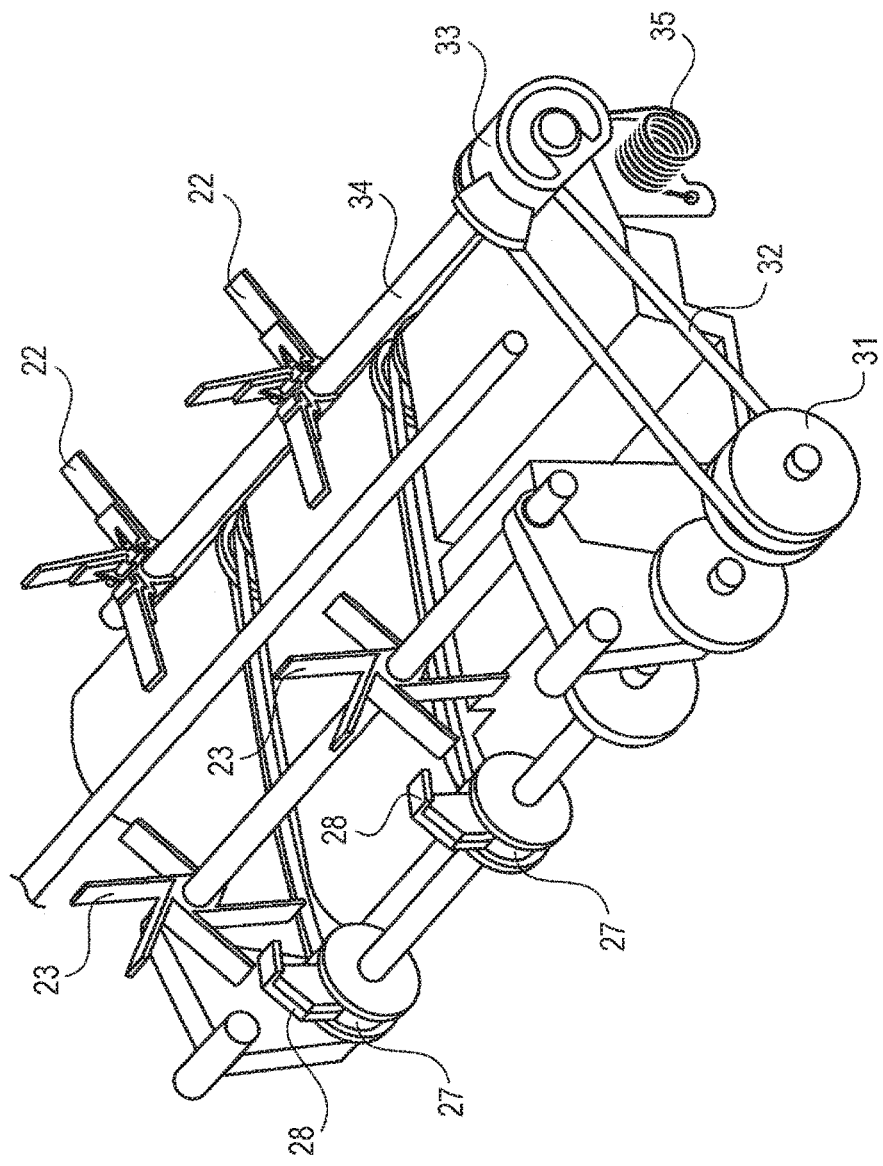
FIG. 5 is a diagram illustrating the peripheral structure of a mechanism for driving sub-paddles in the configuration illustrated in FIG. 4.

FIG. 4 illustrates the ejection port 26 from which a stack of printing sheets is to be ejected and partially illustrates the two sub-paddles 22 that transport the printing sheets to the compilation tray 25. FIG. 5 illustrates the peripheral structure of a mechanism for driving the sub-paddles 22 in the configuration illustrated in FIG. 4.

Referring to FIG. 4 and FIG. 5, a motor 31 serving as a driving source that drives the sub-paddles 22 so that the sub-paddles 22 rotate is disposed on the side on which a side surface of the post-processing apparatus 10 is present. When the motor 31 rotates, a belt 32 is driven, and a pulley 33 rotates. A shaft 34 to which the two sub-paddles 22 are attached is connected to the pulley 33. Accordingly, as a result of the motor 31 rotating, the two sub-paddles 22 are driven so as to rotate. The pulley 33 is urged by a spring 35, and in the case where a driving force of the motor 31 is not applied to the sub-paddles 22, the pulley 33 functions as a stop-position setting unit that sets stop positions of the sub-paddles 22 to predetermined positions.

Figure 6:
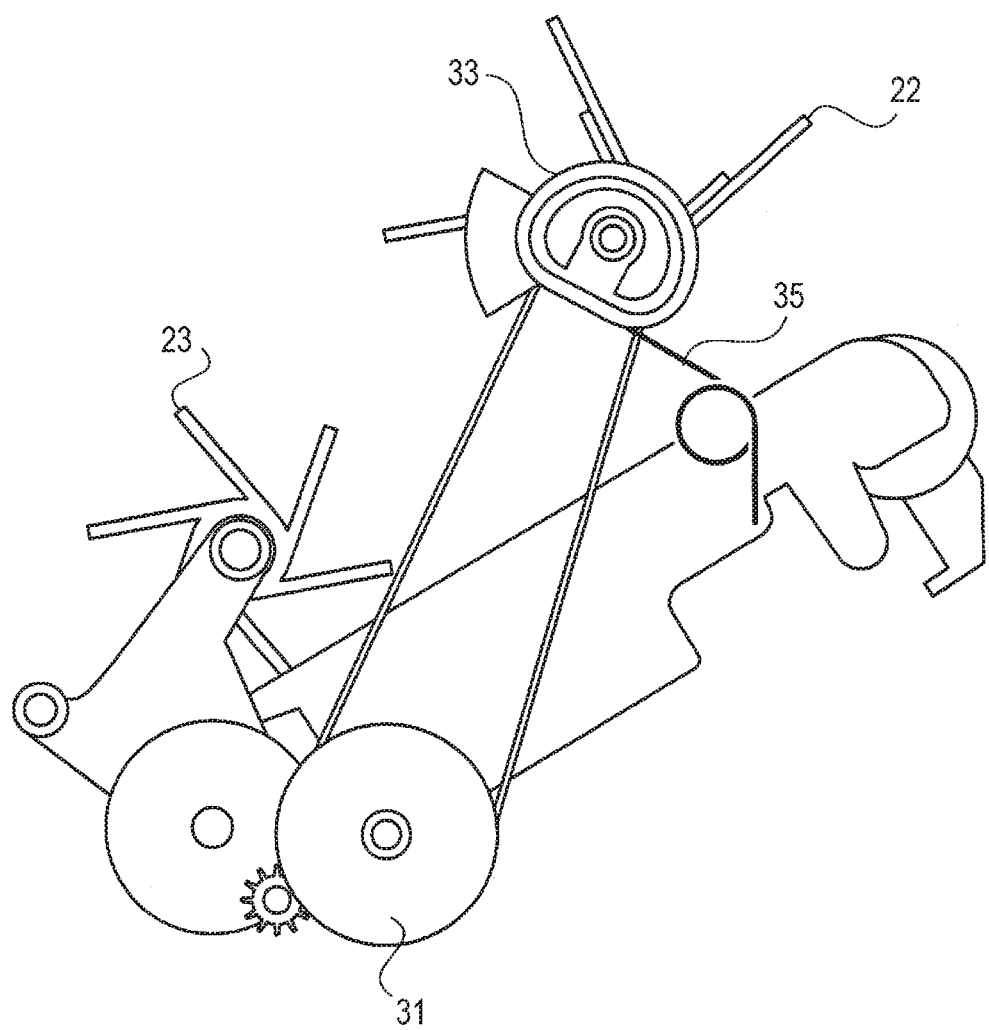
FIG. 6 is an enlarged view illustrating a pulley and the peripheral portion in the structure illustrated in FIG. 5.

FIG. 6 is an enlarged view illustrating the pulley 33 and the peripheral portion in the structure illustrated in FIG. 5.

Referring to FIG. 6, a portion of the pulley 33 having a semicircular shape, the portion being offset with respect to the central axis of the pulley 33 is urged by the spring 35. Thus, when supply of power to the motor 31 is discontinued such that the motor 31 is no longer excited, the pulley 33 becomes capable of freely rotating and stops at a certain position as a result of being pulled by the spring 35.

In each of the sub-paddles 22, the blades are not arranged in such a manner as to be equally spaced over 360 degrees, and each of the blades is provided at a position at which the blade does not hinder a printing sheet from passing through a sheet-transport path when the pulley 33 is stopped at the certain position.

In other words, when the sub-paddles 22 are stopped at the stop positions that are set as a result of the pulley 33 being pulled by the spring 35, the blades do not come into contact with a printing sheet passing through the sheet-transport path and allow the printing sheet to pass through the sheet-transport path without transporting the printing sheet to the compilation tray 25.

As described above, each of the sub-paddles 22 according to the present exemplary embodiment has a structure in which the center of rotation thereof does not move in the vertical direction both in the case of transporting a printing sheet to the compilation tray 25 and in the case of allowing a printing sheet to pass through the sheet-transport path without transporting the printing sheet to the compilation tray 25.

Figure 7:
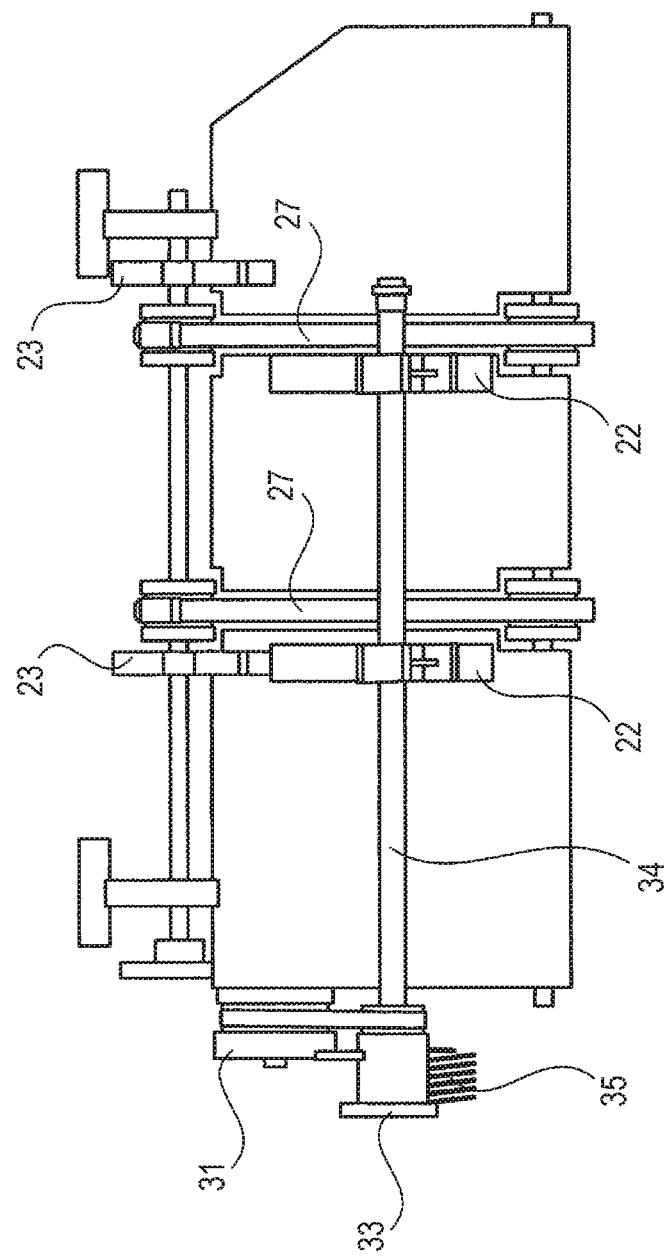
FIG. 7 is a front view of the structure illustrated in FIG. 5.

FIG. 7 is a front view illustrating the structure illustrated in FIG. 5. Referring to FIG. 7, the two sub-paddles 22 are mounted on the shaft 34.

Figure 8:
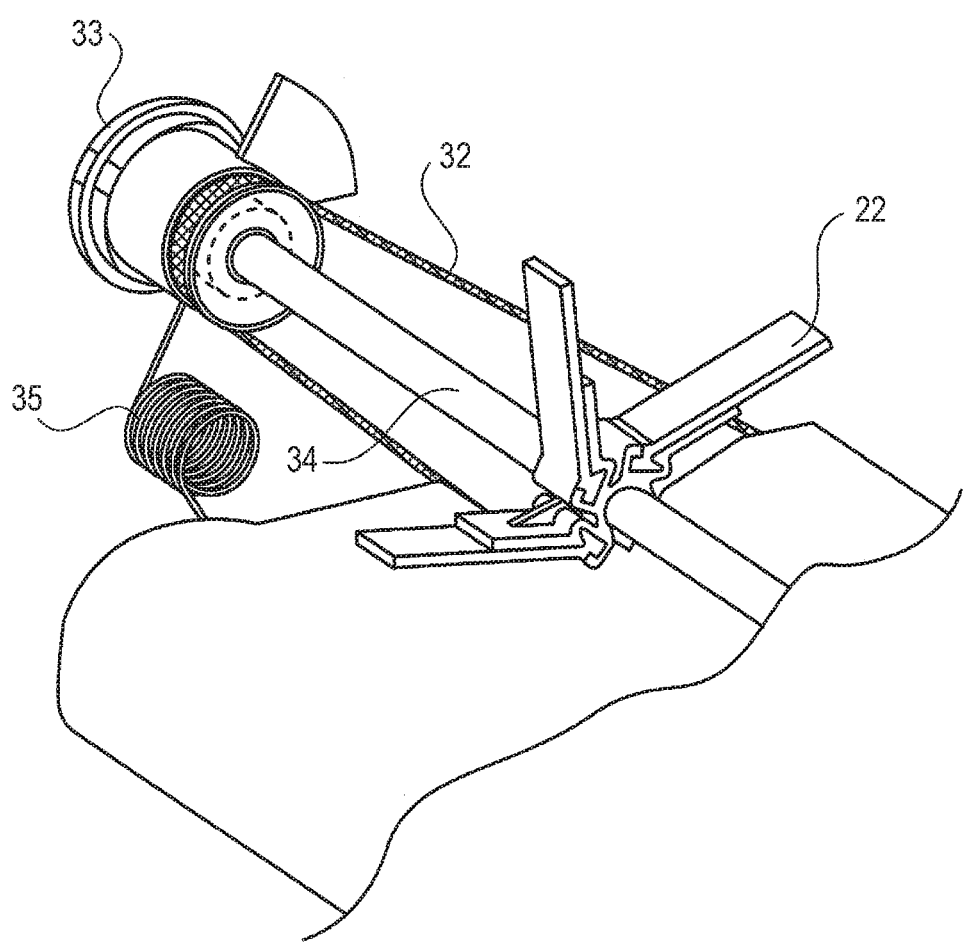
FIG. 8 is an enlarged view illustrating a structure in which the pulley is driven by a belt.

FIG. 8 is an enlarged view illustrating a structure in which the pulley 33 is driven by the belt 32. Referring to FIG. 8, it is understood that, as a result of the belt 32 being wound around the pulley 33, when the belt 32 is driven, the pulley 33 is driven so as to rotate.

Note that, in the present exemplary embodiment, although a case is described in which the motor 31 is a dedicated motor for driving the sub-paddles 22, there is a case where the motor 31 also serves as a driving source of another mechanism. In such a case, a one-way clutch (overrunning clutch) may be provided in the pulley 33 such that the pulley 33 idles when a rotational driving force in the opposite direction is applied to the pulley 33.

The operation of the post-processing apparatus 10 according to the present exemplary embodiment will now be described with reference to FIG. 9 to FIG. 14.

Figure 9:
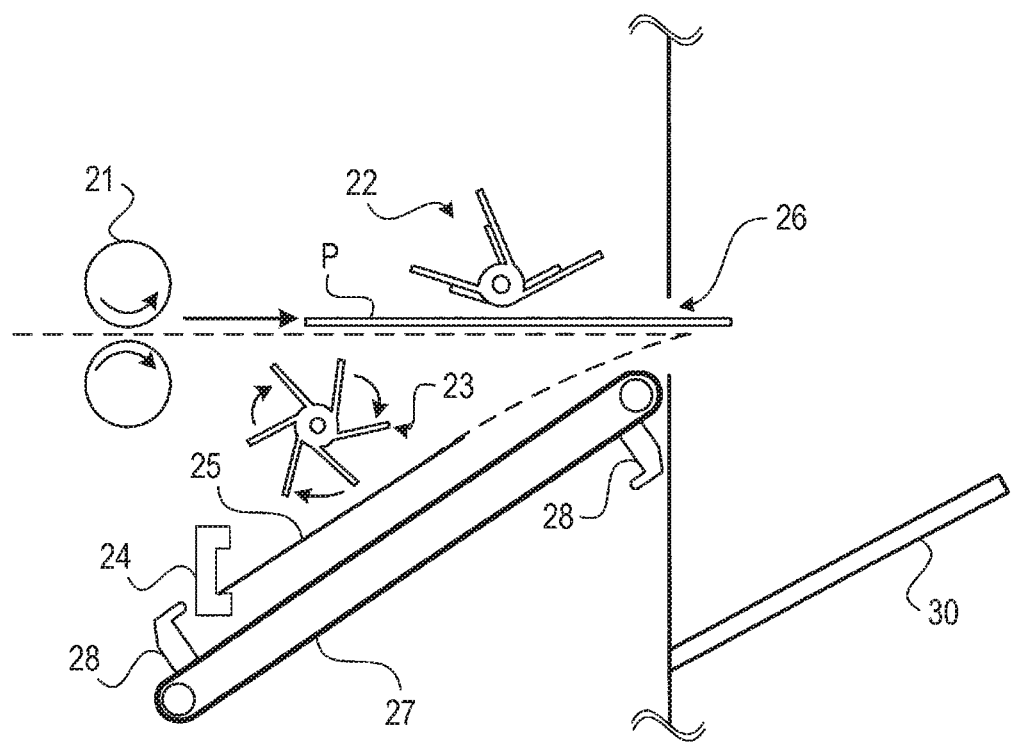
FIG. 9 is a diagram illustrating the operation of the post-processing apparatus according to the exemplary embodiment of the present invention.

First, in an initial state, since the motor 31 is not excited, the stop positions of the sub-paddles 22 are set by an urging force of the spring 35, and the blades of the sub-paddles 22 are stationary at positions at which the blades face away from the sheet-transport path as illustrated in FIG. 9.

Figure 10:
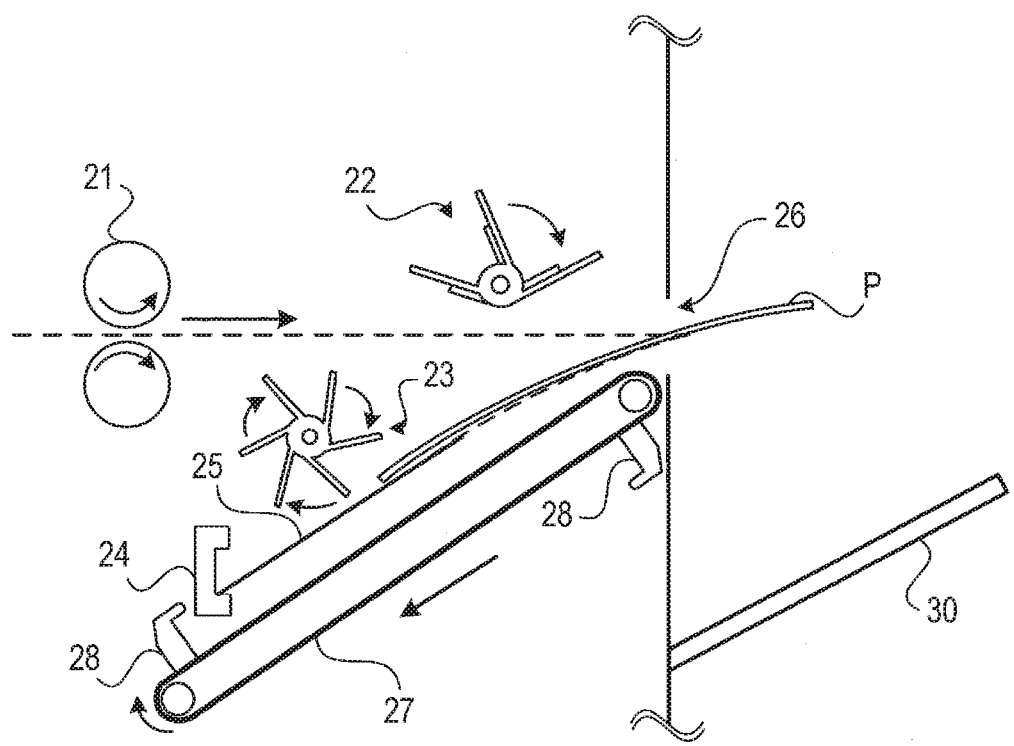
FIG. 10 is a diagram illustrating the operation of the post-processing apparatus according to the exemplary embodiment of the present invention.

Thus, as illustrated in FIG. 10, a printing sheet P transported by the transport rollers 21 passes under the sub-paddles 22 without being hindered and then stops.

Figure 11:
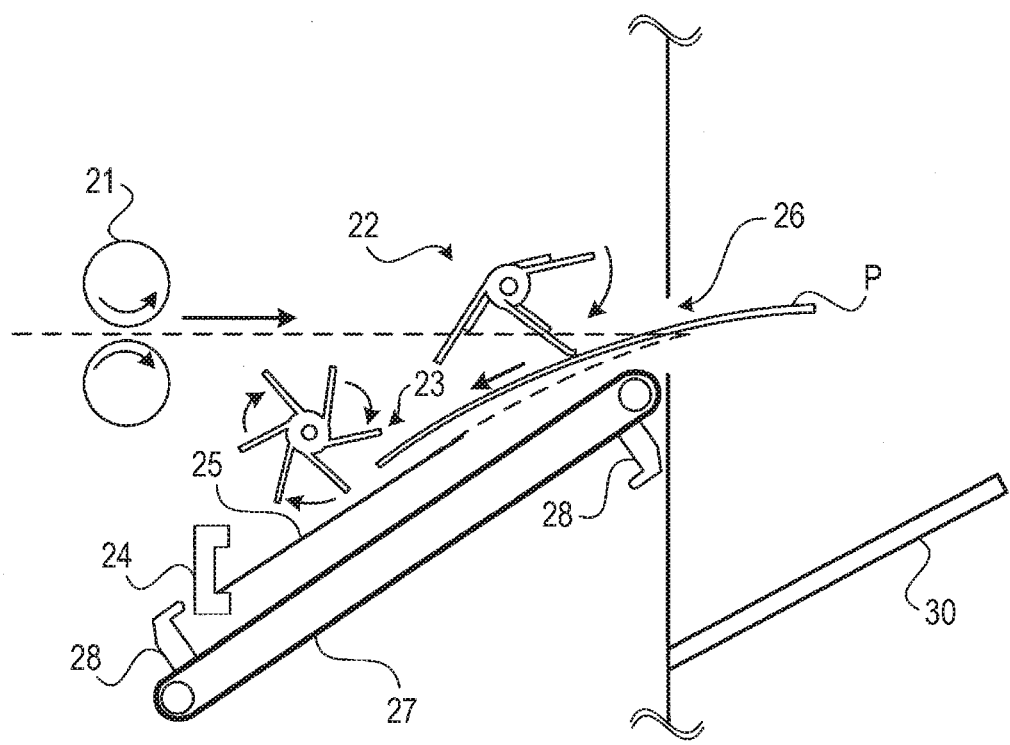
FIG. 11 is a diagram illustrating the operation of the post-processing apparatus according to the exemplary embodiment of the present invention.

In the state illustrated in FIG. 10, when power is supplied to the motor 31 so as to cause the sub-paddles 22 to start rotating, as illustrated in FIG. 11, the blades of the sub-paddles 22 are brought into contact with the printing sheet P, and the printing sheet P is transported in the direction toward the compilation tray 25.

Figure 12:
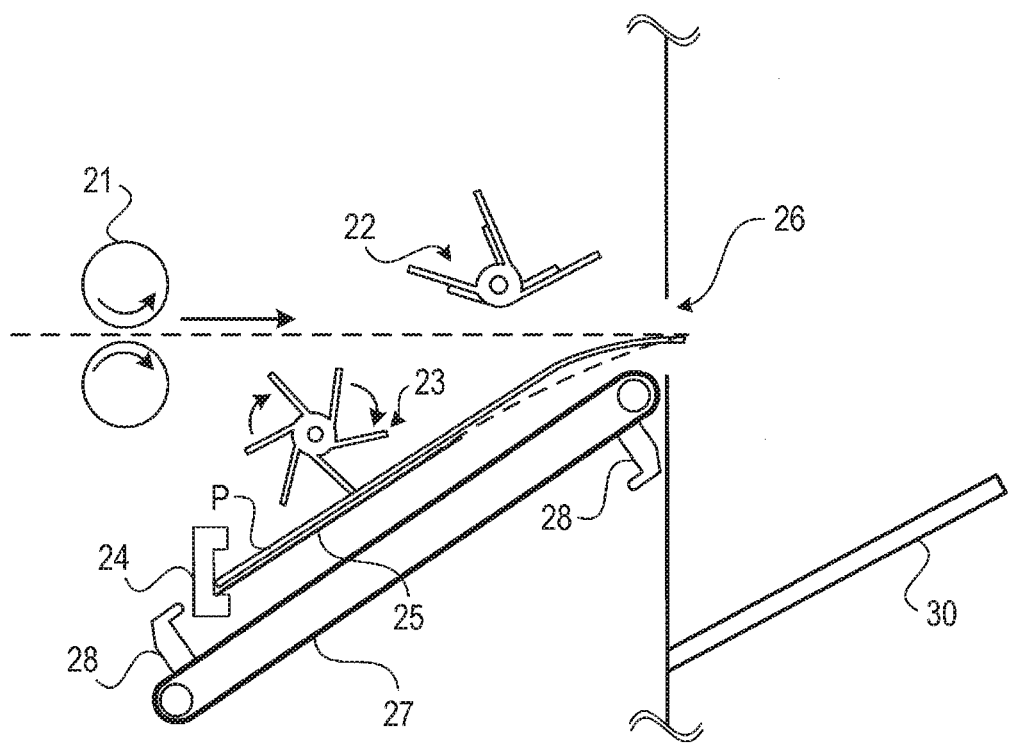
FIG. 12 is a diagram illustrating the operation of the post-processing apparatus according to the exemplary embodiment of the present invention.

Then, as illustrated in FIG. 12, the printing sheet P is brought into contact with the main paddles 23 and transported by the main paddles 23 until the printing sheet P abuts against the end guide 24.

Figure 13:
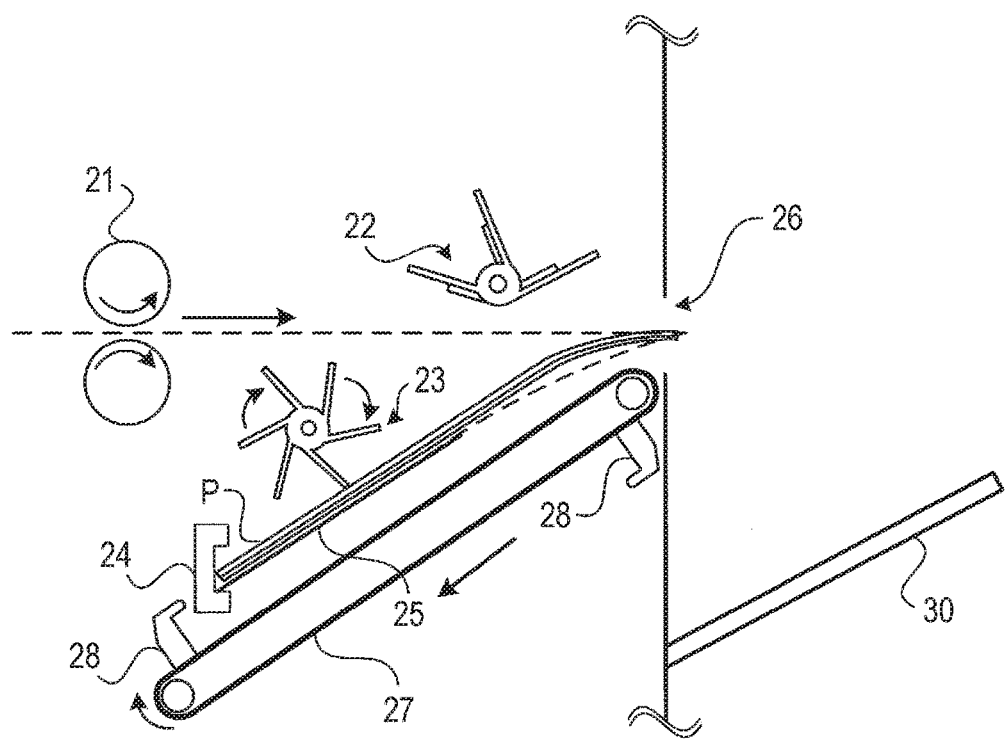
FIG. 13 is a diagram illustrating the operation of the post-processing apparatus according to the exemplary embodiment of the present invention.

Subsequently, when the next printing sheet P is transported by the transport rollers 21, an operation similar to the above is performed, and as a result, the plural printing sheets P are accommodated and stacked one on top of the other in the compilation tray 25 as illustrated in FIG. 13.

When a predetermined number of printing sheets P are accommodated in the compilation tray 25 by repeating such control, post-processing is performed on a stack of the printing sheets P.

Figure 14:
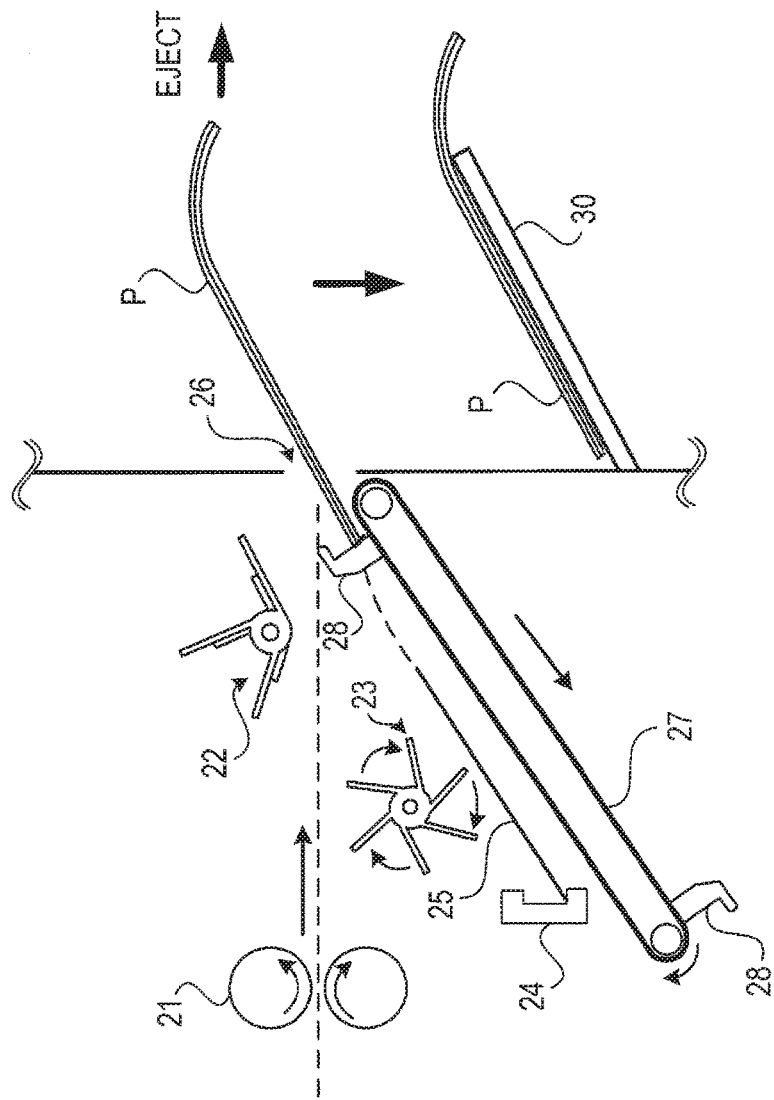
FIG. 14 is a diagram illustrating the operation of the post-processing apparatus according to the exemplary embodiment of the present invention.

When ejecting the stack of the printing sheets P, on which the post-processing has been performed, as illustrated in FIG. 14, the motor 31 is brought into a non-operating state, and the sub-paddles 22 are caused, by the spring 35, to stop at the stop positions at which the sub-paddles 22 do not hinder the passage of the printing sheets P. In such a state, when the ejection belts 27 are driven by a driving source (not illustrated), the stack of the printing sheets P is pushed by the stoppers 28 and ejected from the ejection port 26. As a result, the stack of the printing sheets P, which has been ejected, falls onto the ejection tray 30.

By performing control such as that described above, a stack of printing sheets obtained by performing the post-processing on plural printing sheets, on each of which a printing operation has been performed, is ejected to the ejection tray 30.

A detailed configuration of each of the sub-paddles 22, which have been described above, will now be described with reference to FIG. 15.

Figure 15:
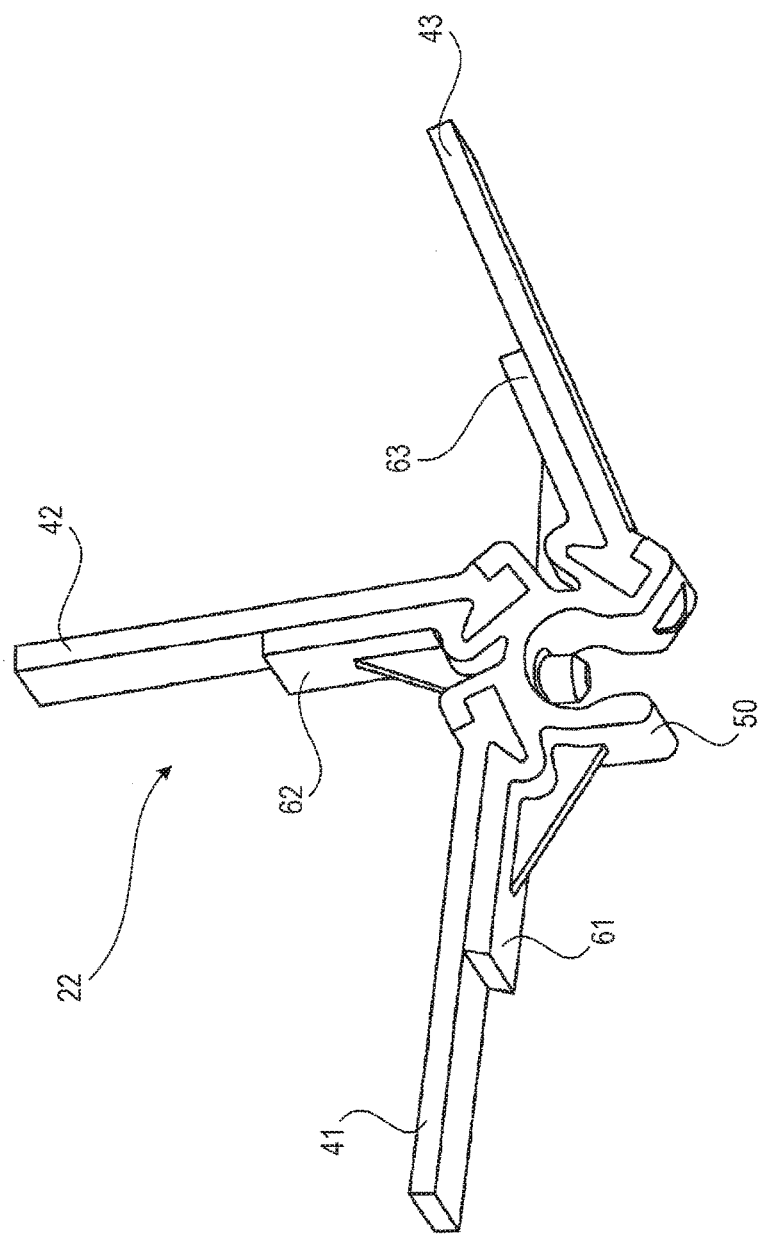
FIG. 15 is a diagram illustrating a detailed configuration of one of the sub-paddles.

As illustrated in FIG. 15, each of the sub-paddles 22 according to the present exemplary embodiment includes three blades 41 to 43 and a base portion 50 that holds the three blades 41 to 43.

Each of the blades 41 to 43 is formed of, for example, an elastic member made of an elastic rubber or the like, which is a material such as ethylene-propylene-diene rubber (EPDM) having a high elastic limit and a low modulus of elasticity. The base portion 50 is formed of, for example, a member made of a resin. The blades 41 to 43 are mounted on the base portion 50 by being fitted into the base portion 50.

While the blades 41 to 43 are mounted on the base portion 50, the base portion 50 functions as a reinforcing portion that reinforces the strengths of portions of the blades 41 to 43 that do not come into contact with a printing sheet. More specifically, the base portion 50 has a structure in which support portions 61 to 63 respectively support and reinforce the bottom portions of the blades 41 to 43 on the rear sides of the blades 41 to 43 when the blades 41 to 43 come into contact with a printing sheet.

Figure 16:
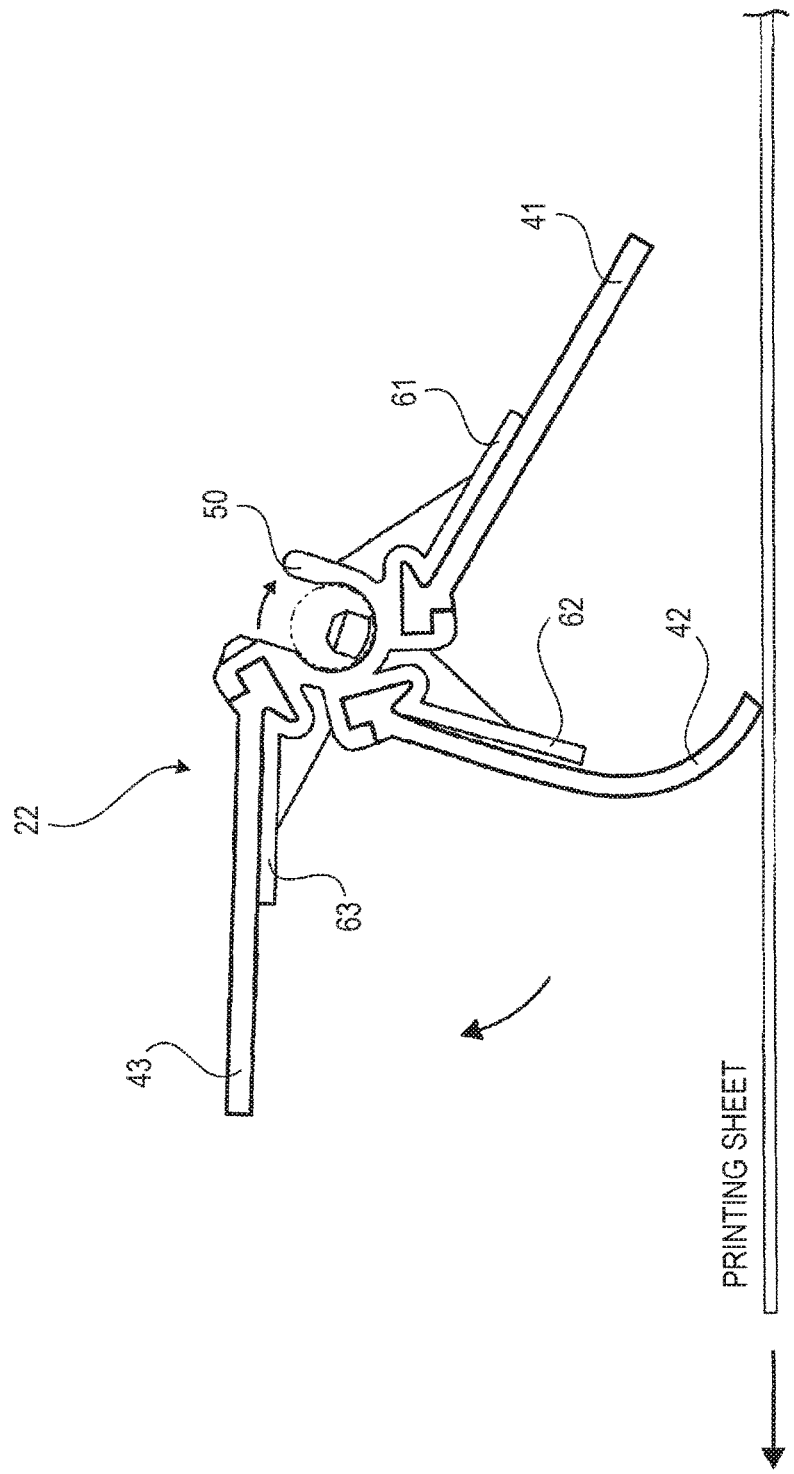
FIG. 16 is a diagram illustrating a state in which a printing sheet is transported by one of the sub-paddles.

FIG. 16 illustrates a state in which a printing sheet is transported by one of the sub-paddles 22, which has the above-described configuration.

The sub-paddles 22 according to the present exemplary embodiment are detachable from the shaft (rotary shaft) 34, which is driven so as to rotate, and when the sub-paddles 22 are required to be replaced due to deterioration thereof, the sub-paddles 22 may be easily replaced.

Figure 17:
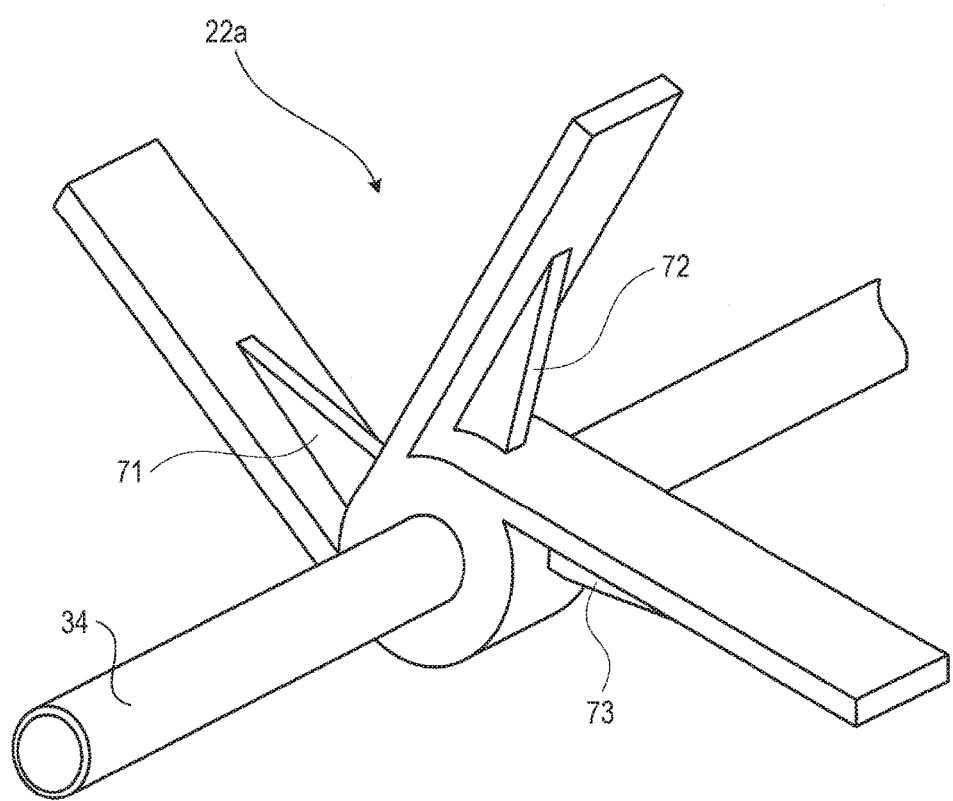
FIG. 17 is a diagram illustrating the configuration of another sub-paddle having a shape different from those of the above-mentioned sub-paddles.

FIG. 17 illustrates, as another shape of each of the sub-paddles 22, a sub-paddle 22a that includes blades and reinforcing portions integrally formed into one member.

The sub-paddle 22a illustrated in FIG. 17 has a configuration in which the blades and the reinforcing portions are integrally formed into one elastic member. In the sub-paddle 22a, reinforcing ribs 71 to 73 that function as reinforcing portions are provided on the rear sides of the blades.

[Modification]

In the above-described exemplary embodiment, although a case has been described in which the present invention is applied to a post-processing apparatus that is configured to be installed onto a printer, the present invention is not limited to such a post-processing apparatus and may also be applied to post-processing apparatuses each having any structure for performing post-processing on a sheet on which a printing operation has been performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A post-processing apparatus comprising:
a storing unit configured to store a plurality of recording media for performing post-processing; and
a transport member configured to transport a recording medium to the storing unis as a result of rotating while being in contact with a surface of the recording medium,
wherein the transport member includes:
a blade configured. to come into contact with the recording medium; and
a reinforcing portion configured to reinforce a strength of a)portion of the blade, wherein the reinforcing portion does not come into contact with the recording medium, and
wherein the blade is formed of an elastic member, and the reinforcing portion is formed of a resin member.

2. The post-processing apparatus according to claim 1,
wherein the elastic member is made of an elastic rubber having a high elastic limit and a low modulus of elasticity.

3. The post-processing apparatus according to claim 2,
wherein the transport member is attachable and detachable to and from a rotary shaft that is driven so as to rotate.

4. The post-processing apparatus according to claim 1,
wherein the transport member is attachable and detachable to and from a rotary shaft that is driven so as to rotate.

5. A post-processing apparatus comprising:
a storing unit configured to store a plurality of recording media for perforating post-processing; and
a transport member configured to transport a recording medium to the storing unit as a result of rotating while being in contact with a surface of the recording medium,
wherein the transport member includes:
a blade configured to come into contact with the recording medium; and
a reinforcing portion configured to reinforce a strength of a portion of the blade,
wherein the reinforcing portion does not come into contact with the recording medium,
wherein the post-processing apparatus further comprises:
a driving source configured to drive the transport member so that the transport member rotates; and
a stop-position setting unit configured to set a stop position of the transport member to a predetermined position when a driving force of the driving source is not applied to the transport member,
wherein the transport member has a structure in which, when the transport member stops at the stop position set by the stop-position setting unit, the blade does not come into contact with a recording medium passing under the transport member and allows the recording medium to pass under the transport member without transporting the recording medium toward the storing unit, and
wherein the blade is formed of an elastic member, and the reinforcing portion is formed of a resin member.

6. The post-processing apparatus according to claim 5,
wherein the elastic member is made of an elastic rubber having a high elastic limit and a low modulus of elasticity.

7. The post-processing apparatus according to claim 6,
wherein the transport member is attachable and detachable to and from a rotary shaft that is driven so as to rotate.

8. The post-processing apparatus according to claim 5,
wherein the transport member is attachable and detachable to and from a rotary shaft that is driven so as to rotate.

9. A post-processing apparatus comprising:
a storing unit configured to store a plurality of recording media for performing post-processing; and
a transport member configured to transport a recording medium to the storing as a result of rotating while being in contact with a surface of the recording medium,
wherein the transport member includes:
a blade configured to come into contact with the recording medium; and
a reinforcing portion configured to reinforce a strength of a portion of the blade, wherein the reinforcing portion does not come into contact with the recording medium,
wherein the post-processing apparatus further comprises:
a driving source configured to drive the transport member so that the transport member rotates; and
a stop-position setting unit configured to set a stop position of the transport member to a predetermined position when a driving force of the driving source is not applied to the transport member,
wherein the transport member has a structure in which, when the transport member stops at the stop position set by the stop-position setting unit, the blade does not come into contact with a recording medium passing under the transport member and allows the recording medium to pass under the transport member without transporting the recording medium toward the storing unit,
wherein the transport member has a structure in which the center of rotation of the transport member does not move in a vertical direction both when transporting, a recording medium to the storing unit and when allowing a recording medium to pass under the transport member without transporting the recording medium toward the storing unit, and
wherein the blade is formed of an elastic member, and the reinforcing portion is formed of a resin member.

10. The post-processing apparatus according to claim 9,
wherein the elastic member is made of an elastic rubber having a high elastic limit and a low modulus of elasticity.

11. The post-processing apparatus according to claim 10,
wherein the transport member is attachable and detachable to and from a rotary shaft that is driven so as to rotate.

12. The post-processing apparatus according to claim 9,
wherein the transport member is attachable and detachable to and from a rotary shaft that is driven so as to rotate.

* * * * *